March 30, 1948.　　S. R. GEIST, SR., ET AL　　2,438,498
TUBE FORMING APPARATUS
Filed April 14, 1945

INVENTOR.
Sidney R. Geist Sr. AND
Norman R. Davis
BY
ATTORNEYS

Patented Mar. 30, 1948

2,438,498

UNITED STATES PATENT OFFICE 2,438,498

TUBE FORMING APPARATUS

Sidney R. Geist, Sr., New York, and Norman R. Davis, Elmhurst, Long Island, N. Y., assignors to Gemloid Corporation, Elmhurst, Long Island, N. Y., a corporation of New York Application April 14, 1945, Serial No. 588,320

13 Claims. (Cl. 154—42)

1

Our invention relates to a novel apparatus for sealing plastic sheeting, and more particularly our invention relates to a novel apparatus adapted to seal the opposed edges of a thermoplastic sheet together to form a tube by applying an internal heat thereto by means of radio frequency current.

In the manufacture of tubes from plastic sheeting it has been customary to join the edges of the sheeting by applying a solvent adapted to soften or partially dissolve the surfaces of the contacting opposed edges of the plastic sheeting so that by means of heat and pressure the softened edges will coalesce to form a bond. Alternatively, an adhesive has been employed and the adhesive either contains a solvent that is activated by heat or the adhesive itself is activated or set by means of heat. Where the plastic sheeting is thermoplastic in nature, then heat may be directly applied to soften the plastic sheet edges to weld them together.

In each of these instances the heat must be applied in sufficient amounts to penetrate through the relatively poorly conducting plastic sheeting so as to raise the contacting surfaces of a plastic sheet to a temperature that will soften said surfaces or activate the adhesive thereon. The quantity of heat applied, therefore, may deleteriously affect the outer portions of the plastic sheet which must be carried to a relatively higher temperature to obtain the required heat at the interface area.

These deleterious effects of overheating can be avoided by the use of radio frequency heating by means of which heat is set up internally in the plastic positioned between two high frequency anodes. The types of apparatus hitherto suggested for welding plastic sheetings by radio frequency current have been unsatisfactory since they do not properly efficiently position the plastic sheeting for welding nor do they apply pressure in the most effective manner.

The apparatus of our invention provides an efficient manufacturing means for positioning the edges of sheeting, and particularly the two edges of a sheet so as to form that sheet into a tube and for applying welding pressure thereto.

The object of the present invention, therefore, is to provide an apparatus for efficiently welding plastic sheet material.

It is a further object of the present invention to provide an apparatus adapted to hold plastic sheeting in tube form while sealing the edges of the sheeting by radio frequency current.

It is a further object of the present invention to provide an apparatus by means of which plastic

2 sheeting can be arranged on a rack prior to its insertion between the actual heating electrodes to facilitate the welding operation.

Other objects of the invention will be apparent from a consideration of the specific description which follows.

The various objects are accomplished by providing a rack for pre-positioning the plastic sheeting in a ram pressing, radio frequency current heating seam welding device.

Figure 1:
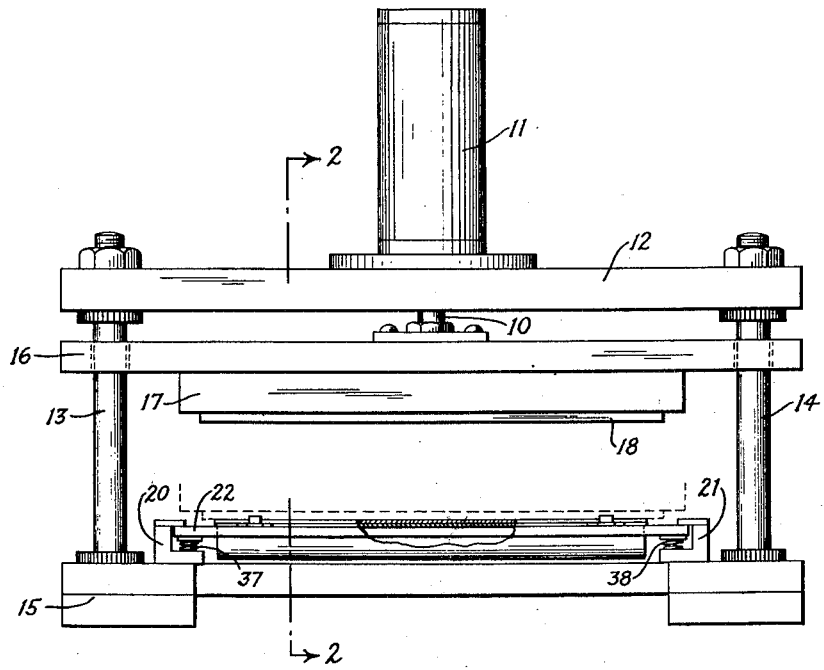
Fig. 1 is a front view of the apparatus of our invention.

Referring now more specifically to the drawings, in Fig. 1 we show a piston 10 operated from a hydraulic cylinder 11 mounted on a cross piece 12 supported by two vertical elements 13 and 14. To the piston 10 is secured the cross piece 16 which moves vertically and is guided by the vertical elements 13 and 14. Secured to the cross piece 16 is an insulating element 17 on which is placed and secured the electrode 18 suitably connected as shown by the conductor 19 to a source of high frequency on the order of 10 to 40 megacycles.

The vertical elements 13 and 14 are supported on a base 15; also fixed to the base 15 are side tracks 20 and 21 adapted to receive the rack 22.

Figure 3:
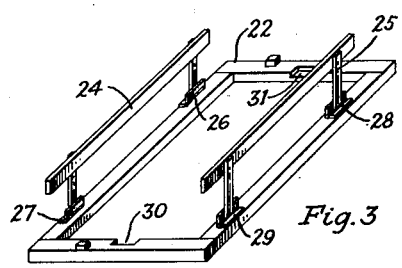
Fig. 3 is a perspective view of the rack adapted to hold the plastic sheeting in tube form.

The rack 22 is shown in detail in Fig. 3 and comprises a skeleton frame to which are attached tube retaining side bars 24 and 25 hingedly connected at 26, 27, 28, and 29 to the base frame. At the opposite ends of the rack 22 are recesses 30 and 31 into which recesses fit the ends of center piece 32 of the element 33 which comprises a center piece 32 with two side elements 34 and 35 secured thereto.

Figure 2:
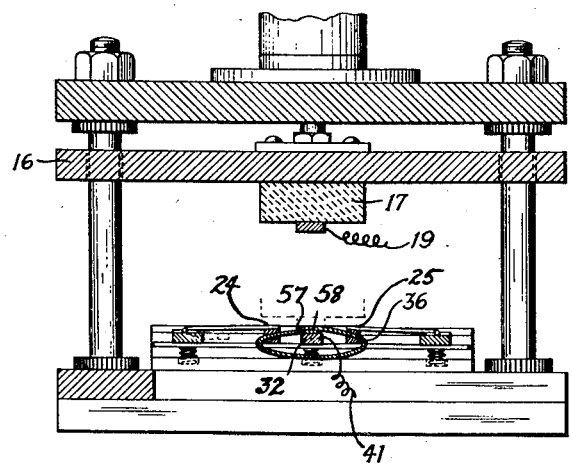
Fig. 2 is an end view, taken along line 2—2 of Fig. 1.
Figure 4:
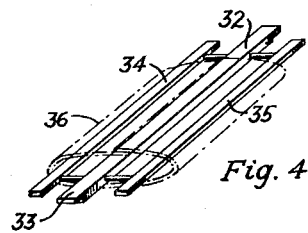
Fig. 4 is a perspective view of an element around which the sheeting is wound into tube form for insertion in the rack.

As shown in Figures 2 and 4, a plastic sheet 36 is arranged or wrapped around the element 33 and its side elements 34 and 35 with the edges 57 and 58 overlapping and resting on the center piece 32. With the sheet 36 wrapped about the element 33, the element 33 is placed in the rack 22, the ends of the center piece 32 fitting into the recesses 30 and 31 of the rack 22.

The side bars 24 and 25 are shown brought down so as to uniformly press, as shown in Fig. 2, against the plastic sheeting 36 so as to maintain it in proper position for the welding operation. The rack 22 with the tube in place is then inserted in the tracks 20 and 21, the resilient supporting elements 37 and 38 pressing against and holding the rack in proper position for the operation.

The hydraulic pressure element 11 is then actuated to force the piston 10 down whereupon the electrode 18 is pressed down on the overlapped edges 57 and 58 of the plastic sheet 36. The resilient supporting elements 37 and 38 yield under the pressure and the rack 22 moves downwardly until the springs 37 and 38 are compressed. Radio high frequency current is introduced through conductor 19 between the upper electrode 18 and the lower electrode 32 which is grounded through 41. Heat is thereupon developed between the overlapped edges 57 and 58 which causes the thermoplastic sheet material to soften and coalesce forming a secure bond between the overlapped edges 57 and 58.

When the operation is completed the piston 10 is retracted carrying up with it the attached electrode 18, the rack 22 is withdrawn from the tracks 20 and 21, and the side bars 24 and 25 lifted up and the welded plastic tube slipped off the element 33.

Thus, the plastic sheeting 36 is preshaped to tube form over the element 33, secured in position in the rack 22, and such racks with sheeting in position may be continuously fed into the welding device for the heating and pressing operation that effects the edge welding.

The operation of the apparatus is essentially simple and the assembly of the tube in and on the rack is such as to make tube forming operation rapid and efficient. The lower electrode 32 which is the center piece of the rack element 33 is preferably grounded through the frame via the tracks 20 and 21.

It is to be understood that various modifications of this invention will suggest themselves to those skilled in the art from a consideration of the specific description and showing here given. It is to be understood that the various details of the various forms of our invention can be modified and we intend to be limited only by the claims appended hereto.

We claim:

1. Means for heat sealing plastic material comprising a pressure element, an electrode mounted on said pressure element, means for applying high frequency current to said electrode, means for insulating said electrode, means for applying pressure to said pressure element, in combination with a rack and a cooperating rack element, said rack element being shaped to receive plastic material wrapped thereabout and having portions extending beyond the ends of the wrapped plastic material adapted to be received by said rack, means mounted on said rack for holding plastic material in wrapped position, means for positioning said rack with said cooperating rack element under said pressure element.

2. Means for heat sealing plastic material comprising a pressure element, an electrode mounted on said pressure element, means for applying high frequency current to said electrode, means for insulating said electrode, means for applying pressure to said pressure element, in combination with a rack and a cooperating rack element, said rack element being shaped to receive plastic material wrapped thereabout and having portions extending beyond the ends of the wrapped plastic material adapted to be received by said rack, means mounted on said rack for holding plastic material in wrapped position, means for positioning said rack with said cooperating rack element under said pressure element, said means comprising tracks adapted to receive said rack.

3. Means for heat sealing plastic material comprising a pressure element, an electrode mounted on said pressure element, means for applying high frequency current to said electrode, means for insulating said electrode, means for applying pressure to said pressure element, in combination with a rack and a cooperating rack element, said rack element being shaped to receive plastic material wrapped thereabout and having portions extending beyond the ends of the wrapped plastic material adapted to be received by said rack, means mounted on said rack for holding plastic material in wrapped position, means for positioning said rack with said cooperating rack element under said pressure element, said means comprising tracks adapted to receive said rack, and means for yieldably holding said rack in said tracks.

4. Means for heat sealing plastic material comprising a pressure element, an electrode mounted on said pressure element, means for applying high frequency current to said electrode, means for insulating said electrode, means for applying pressure to said pressure element, in combination with a rack and a cooperating rack element, said rack element being shaped to receive plastic material wrapped thereabout and having portions extending beyond the ends of the wrapped plastic material adapted to be received by said rack, means mounted on said rack for holding said plastic material in wrapped position, said means comprising side bars hingedly mounted on said rack, means for positioning said rack with said cooperating rack element under said pressure element.

5. Means for heat sealing plastic material comprising a pressure element, an electrode mounted on said pressure element, means for applying high frequency current to said electrode, means for insulating said electrode, means for applying pressure to said pressure element, in combination with a rack and a cooperative rack element, said rack element comprising a center piece and two attached side elements, said rack element being shaped to receive plastic material wrapped thereabout and having portions extending beyond the ends of the wrapped plastic material adapted to be received by said rack, means mounted on said rack for holding said plastic material in wrapped position, said means comprising side bars hingedly mounted on said rack, means for positioning said rack with said cooperating rack element under said pressure element.

6. Means for heat sealing plastic material comprising a pressure element, an electrode mounted on said pressure element, means for applying high frequency current to said electrode, means for insulating said electrode, means for applying pressure to said pressure element, in combination with a rack and a cooperating rack element, said rack element comprising a center piece and two attached side elements, said rack element being shaped to receive plastic material wrapped thereabout and having portions extending beyond the ends of the wrapped plastic material adapted to be received by said rack, means mounted on said rack for holding said plastic material in wrapped position, said means comprising side bars hingedly mounted on said rack, means for positioning said rack with said cooperating rack element under said pressure element and means for grounding said center piece.

7. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting, means comprising side bars hingedly mounted on said rack for holding said plastic sheeting in position with overlapping edges.

8. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current to said overlapped plastic sheet edges.

9. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current and pressure to said overlapped plastic sheet edges.

10. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout and having portions extending beyond the ends of the wrapped plastic sheeting adapted to be received by said rack, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current and pressure to said overlapped plastic sheet edges.

11. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current and pressure to said overlapped plastic sheet edges and means for yieldably positioning said rack and rack element so that the overlapped edges of the plastic sheeting are between the center piece of the rack element and the means for applying high frequency current and pressure.

12. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current and pressure to said overlapped plastic sheet edges, said means comprising an electrode adapted to be pressed against said overlapped edges.

13. A high frequency sealing apparatus for forming tubing from thermoplastic sheeting which comprises a rack and a cooperating rack element, said rack element comprising a center piece and two side bars fixed in spaced relation to said center piece, said rack element being shaped to receive plastic sheeting wrapped in tube form thereabout, said rack adapted to surround and hold the said rack element having the wrapped plastic sheeting thereabout without distorting said wrapped sheeting means comprising side bars hingedly mounted on said rack for holding said plastic sheeting in position with overlapping edges and means for applying high frequency current and pressure to said overlapped plastic sheet edges, said means comprising an electrode adapted to be pressed against said overlapped edges and means for grounding the centerpiece of said rack element.

SIDNEY R. GEIST, SR.
NORMAN R. DAVIS.

REFERENCES CITED

The following references are of record in the file of this patent:

UNITED STATES PATENTS

| Number | Name | Date |
|---|---|---|
| 2,341,617 | Hull | Feb. 15, 1944 |
| 847,966 | Munz | Mar. 19, 1907 |
| 1,810,585 | Young | June 16, 1931 |
| 2,087,480 | Pitman | July 20, 1937 |
| 2,114,625 | Bergstein | Apr. 19, 1938 |
| 2,032,343 | Arthur | Mar. 3, 1936 |

FOREIGN PATENTS

| Number | Country | Date |
|---|---|---|
| 658,965 | Germany | Apr. 22, 1938 |